Sept. 22, 1959  H. A. THOMAS  2,904,835
SLUDGE DELIQUEFYING COMPARTING PRESS
Filed Dec. 10, 1956  3 Sheets-Sheet 1

2,904,835

SLUDGE DELIQUEFYING-COMPACTING PRESS

Henry A. Thomas, Baton Rouge, La., assignor to Ethyl Corporation, New York, N.Y., a corporation of Delaware Application December 10, 1956, Serial No. 627,183

2 Claims. (Cl. 18—20)

This invention relates to apparatus for deliquefying thick sludges or muds, and for concurrently compressing the solids thereof into easily handled, cohesive forms. More particularly, the invention relates to apparatus for performing the described operations on systems wherein the solids are, in large part, finely divided metals, especially lead metal. Lead sludges of this type are resultant from certain chemical reaction, for example, as by-product compositions from the manufacture of alkyllead compounds.

The more common methods of separating liquid-solid systems are, unfortunately, not effective for many sludge systems having a high solids proportion. Thus, filtration or sedimentation are not effective or applicable when the sludge to be processed has only a few percent liquids in it. This is especially true for sludges resultant in the manufacture of tetraalkyllead compounds, which sludges are particularly suitable for processing by the apparatus of the present invention. Such lead sludges have certain additional peculiar properties so that a brief description of their origin and properties is desirable.

Tetraethyllead is synthesized commercially by the reaction of sodium lead alloy and liquid ethyl chloride, the latter in stoichiometric excess. Upon termination of reaction, a batch reaction mixture contains over three-fourths of the original lead charged, tetraethyllead product, sodium chloride, some excess ethyl chloride and other minor components. The tetraethyllead is, in large part, probably present as a surface layer or adherent film on the particles of lead, these particles having a high surface to volume characteristic, as well as being rather fine on the basis of maximum dimensions. This stiff, pasty reactions mass, after venting off excess ethyl chloride, is charged to a pool of water and the tetraethyllead is removed in large part by steam distillation. Concurrently, the bulk of the sodium chloride content is dissolved in the aqueous phase. The residue from this operation, after free draining of the liquid phase, is a predominantly lead solids system, wet with a dilute salt brine and having only minor proportions of entrapped liquid tetraethyllead. It has been the practice to dry this material in steam heated dryers, vaporizing most of the liquid in the free drained sludge. The tetraethyllead vaporized was later recovered by stratifying from the aqueous condensate and drawing off separately. The dried sludge was then fed to smelting furnaces for remelting and recovery of the lead. This drying operation has left much to be desired. Among its drawbacks have been relatively inefficient drying, or, at least, highly variable results. In addition, the delivery of the dried product as finely divided solids is responsible for certain difficulties in the smelting operation. It has been proposed to provide a pressing operation instead of the drying step mentioned above, but heretofore no satisfactory apparatus has been known for effectively carrying out such a pressing operation. One reason why conventional presses have not been successful is because of the finding that in a pressing operation, the resistance of a batch charge to volume reduction is highly variable. In general, a moderate pressure is ample for an initial stage, but this must be followed by a very high pressure operation. Further, the necessity of charging a press chamber and of discharging and removing from a press a processed charge provides additional segments of an overall pressing operation. When it is attempted to accomplish all of these cycle segments with a unitary apparatus, it is found that the significant or most important portions are utilized only ineffectively. Hence, a need exists for a press which segregates discrete charges according to the segment of an overall pressing cycle to be performed thereon.

An object of the present invention is, then, to provide a new and improved apparatus or press for press-deliquefying and compacting of sludges of high solids content. A more specific object is to provide a press especially suited for deliquefying high solids sludges having finely subdivided metals as the major solids components. An additional object is to provide a press having special means for sequentially and separately performing individual portions of an overall pressing-deliquefying operation which produces compacted shapes which provide the metal components in forms particularly susceptible to efficient subsequent handling or recovery operations. A still further object is to provide a new and highly effective press structure which is particularly adaptable to automatic operation. A more specific object of preferred embodiments of the invention is to provide a press mechanism including a transport device for sequentially positioning discrete charges in different stations, coupled with a common powering system for the press and transport operations. Yet another object of certain embodiments of the invention is to provide a press apparatus with novel automatic control means incorporated therewith.

In its most general form, the apparatus of the present invention includes a plurality of chamber-ram units, a transport mechanism for movement of these chamber-ram units, this transport or movement means being adapted to serially position the individual members of the plurality of chamber-ram units in separate work positions or stations. Associated with each of the several stations mentioned above are means for performing discrete segments of the total desired deliquefying-compacting treatment to be provided by the apparatus. These several segments or sub-portions of apparatus to provide the required operating steps in a complete cycle, invariably include a charge station, at least one initial compression station, a final compression station, and a compacted, or formed charge ejection station. Broadly, the invention of the present apparatus resides in the provision of transportable chamber-ram units capable of being cyclically positioned in serial fashion, integrated or coupled with means for performing the necessary portion of a total cycle at each position or station. As is shown in more detail hereinafter, the structure of the present invention eliminates a great amount of inefficient or ineffectively utilized portions of an operating cycle. As will be seen from the detailed description hereinafter given, numerous embodiments of the present invention can be provided without departing from the scope thereof. In addition, certain embodiments of the invention include supplemental and highly beneficial additional features. The principles of the apparatus of the invention will be readily understood from the description given below, particularly in conjunction with the figures wherein:

Fig. 1 is a vertical elevation showing generally the major components of a typical highly preferred embodiment of the invention, Fig. 2 includes a plan view of a means or table which serves as a transport device for a plurality of open ended cylindrical chambers. Included in this figure are schematic vertical cross sectional illustrations, Figures 2b, 2c, 2d, 2e, showing the said chambers. These cross sections show the relation of the parts of individual chamber-ram units, and of the charge of sludge contained in the individual chamber-ram unit, as well as the means associated with the several stations associated with the transport mechanism. An enlargement.

Fig. 3 is an enlarged view of the ram return assembly, comprising a subassembly mounted on the end of the piston of a double-acting hydraulic cylinder-piston unit, and also a cylindrical cam device for disengaging the above subassembly from a ram.

Fig. 4 is a partial plan view of the embodiment of Fig. 1, showing the top of a main press, the transport mechanism and several of the chambers of the chamber ram units associated therewith, and also a horizontally disposed double-acting hydraulic cylinder-piston unit for ejection of the completed solids billet.

In order to most readily understand the operation of the several variants of the invention, reference is firstly made to the embodiment illustrated generally by the above mentioned figures, this description being purely for illustrative purposes. It will be apparent to one skilled in the art, particularly as discussed in more detail hereinafter, that appreciable variation can be made in the several elements of the invention, without departing from the scope thereof.

Figures 1, 3, 4:
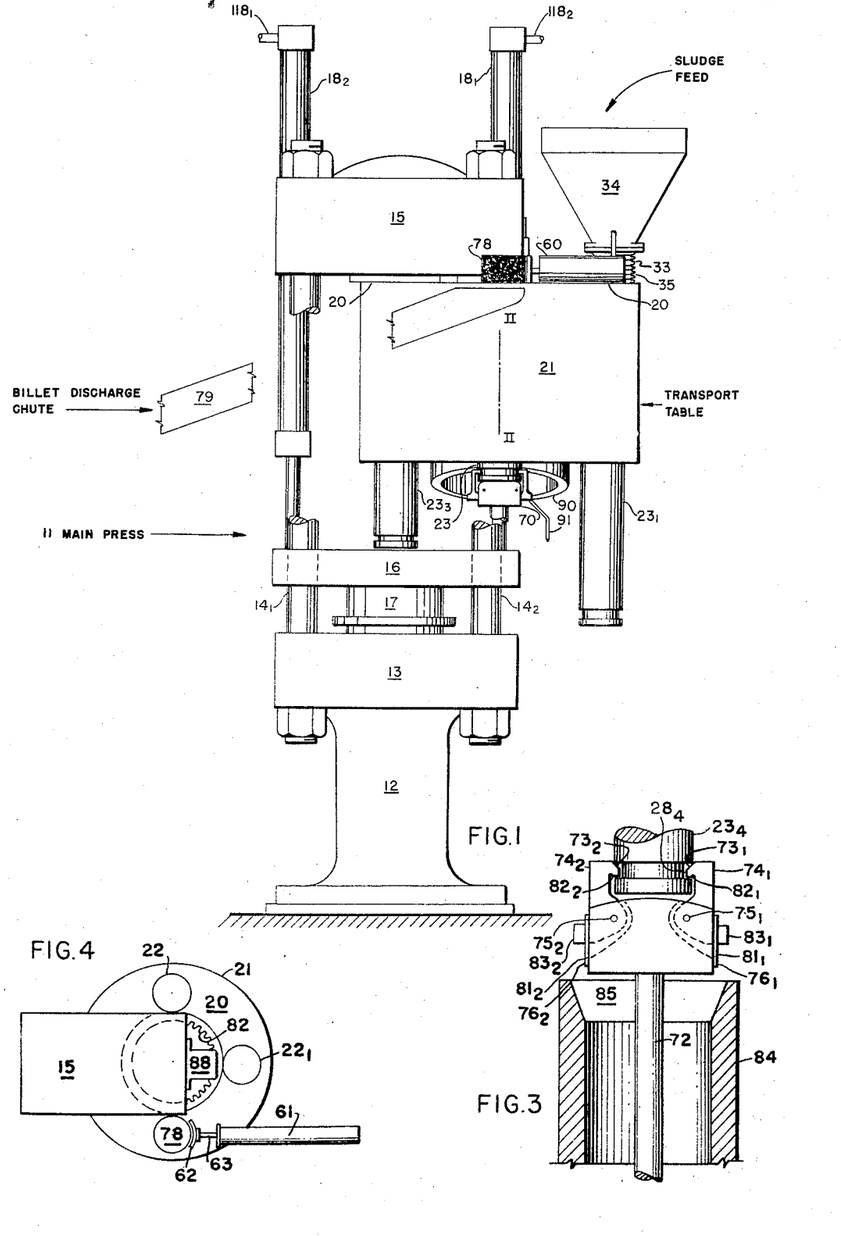

Referring firstly to Fig. 1 a vertical elevation of a typical embodiment of the invention is shown. The principal portions of the apparatus include a main press 11, a transport table 21, and ram-chamber units (also referred to as cylinder-ram units), each including a chamber 22 and a matching ram 23, these units being incorporated within the transport table 21. In addition, means are provided at several stations, to which the transport table 21 can position the cylinder-ram units, for effecting desired operations. The means include a feeding means a precompression mechanism, and discharge means. It will also be understood from the following description that the so-called "main press' is a further means associated with the several stations to which the transport table 21 can position a cylinder-ram unit, and, further, that conventional support structure (not shown) is desirably provided to maintain some of the sub-assemblies in fixed operative relation to other portions of the apparatus.

The main press 11 includes a base 12, having a broadened top portion or base head 13. Affixed to the base head 13 is a plurality, preferably four, of vertical guide rods or guides $14_1$, $14_2$, which support and maintain in fixed position a press head 15. Above the press head 15 are shown terminal portions of two push back units $18_1$, $18_2$ each unit including a cylinder and accompanying piston actuated by hydraulic pressure as desired. A portion of hydraulic liquid supply lines $118_1$, $118_2$ leading into the cylinder of the push back units $18_1$, $18_2$ is shown. A portion of a ram return assembly 70 is shown affixed to a ram $23_4$ positioned in a discharge station. At this station also is shown an ejection unit 60 by means of which a completed billet 78, of pressed, deliquefied material, may be discharged. Associated with the feed or charging station is an assembly by which the sludge to be produced may be gravity fed into the open chamber $22_1$. This is accomplished by means of a flexible connection or bellows 33 attached to a hopper 34, and having a ring face 35 which makes a slidable press contact with the upper surface 20 of the transport table 21.

The main press 11 has a platen 16 mounted on a ram 17, the ram being slidable vertically inside a cylinder (not shown) within the press base 12. The platen has holes corresponding to the guides 14 for vertical movement on a guided path. Movement of the ram 17 is in response to hydraulic liquid flow obtained by a system for supplying relatively noncompressible hydraulic liquid under desired pressure.

As previously mentioned, associated with the main press 11 is a transport device or turntable 21. The table 21 includes as integral parts thereof a plurality, in this instance four chambers $22_1$, $22_2$, $22_3$, $22_4$ (shown in Fig. 2). Mounted in each of said cylindrical chambers (which are open ended, smooth wall, cylinders) are individual rams $23_1$, $23_2$, $23_3$, $23_4$. Each of these rams forms with the corresponding cylinder unit an assembly referred to herein as chamber ram units.

An important feature of each of these cylinder-ram units is a ram locking device described more fully hereinafter. The function of the locking device is to preserve, substantially unchanged, the vertical disposition of a ram 23 within its mating chamber 22, as the ram-chamber unit is transferred from one work station to another. This feature also results in a preservation of the status of and position of the charge of sludge (whether partly or fully pressed) contained in a given chamber.

A further element of the apparatus is a collecting pan 90, mounted generally below the transport table 21. This pan is generally a sheet metal container for receiving collectively liquid expressed from the charges in the chambers 22. A take-off line 91 from this collector pan 90 is provided to deliver by gravity flow the liquid phase to subsequent separatory equipment.

Certain other essential additional elements or subcombination assemblies associated with this embodiment are not shown in Fig. 1, but their relations to the portion there illustrated is given later for purposes of easy explanation.

Generally, it should be stated that the transport table 21 revolves about a fixed axis (II) through, in this instance a repetitive series of 90° arc rotations. By means of this cyclic part rotation, it will be seen that each of the ram-chamber units is successively positioned on the center of the main press over platen 16 which provides the final compression of the sludge in a given ram-chamber unit.

Preceding a final compression station are two preprocessing stations, a feed station and a pre-compression station. Subsequent to the final compression of the sludge is a discharge and ejection station. At this position, means are provided to remove the billet 78 from a chamber 22, and also, usually, to pass the billet to a chute to subsequent storage or process equipment. In addition, means are provided to retract the ram $23_4$ to its lowermost position and the ram-chamber unit thereby made ready for the feed station which is the initial station or the beginning of a cycle.

Figure 2:
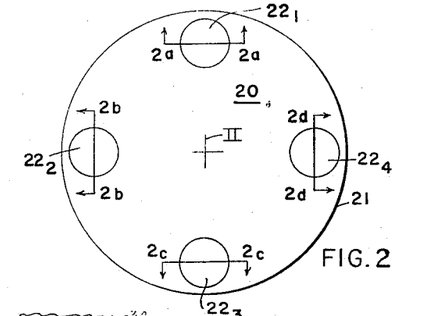

The overall sequence of operations at the several stations is further shown by reference to Figures 2, 2a, 2b, 2c, 2d, 2e, which shows schematically the functioning of the press 11 and in addition supplemental means associated with the several positional stations. Shown in Fig. 2 is a schematic plan view of the table 21 showing the 90° spaced apart positions of the four chambers $22_1$, $22_2$, $22_3$, $22_4$. It will be seen that, for example, rotation of the table 21 a quarter turn or 90° from the position shown will position chamber $22_1$ in the station previously occupied by chamber $22_4$. In other words, each chamber occupies in serial fashion each of four sequential stations. Now, turning to Figures 2a, 2b, 2c, 2d, 2e, schematic sectional elevations of each of the four ram-chamber 22 units are shown in positions occupied in the four separate stations. In addition, typical operative means for accomplishing desired functions at those stations are schematically shown.

As already stated, a particularly beneficial feature of the embodiment of Fig. 1 is a special lock device for maintaining the vertical disposition of a ram 23 upon completion of the operation at a specific station and transport to the succeeding station. Details of this device will be seen in Fig. 2a which is the partial section view 2a—2a of Fig. 2. A lock ring $25_1$ is provided at the bottom of the cylinder $22_1$. The lock ring $25_1$ is a generally annular piece having an internal diameter slightly larger than the diameter of the ram $23_1$. The ring is pivotally attached by a hinge pin $27_1$ to the bottom of the transport table 21 adjacent the cylinder chamber $22_1$. It will be apparent that upward movement of the ram $23_1$ will not be prevented by the lock ring $25_1$. However, when this upward thrust is terminated, the downward pivoting of the lock ring $25_1$ about the hinge pin $27_1$ will result in a binding action of the lock ring $25_1$ on the ram $23_1$. This mechanism has been discovered to provide certain unanticipated ancillary advantages. Firstly, being positioned so closely to the terminus of the cylindrical chamber $22_1$ which forms a guide for the ram $21_1$, the lock ring in operation does not skew the ram $23_1$ and thus tend to cause any gouging of the cylinder walls. Further, it will be seen that the latching action of the lock ring $25_1$ will necessarily permit a very slight downward movement of the ram proper under the influence of gravity. This slight retraction fortuitously results in a slight withdrawal of the charge from the upper surface of the transport table 21. This is beneficial in the movement from the charging stage to the pre-compression stage, and from the precompression stage to the final compression stage. The benefit derived is that the upper surface of the charge within the cylinder does not, normally, come in contact with external parts during the movement between stations.

A further important feature of each of the cylinder-ram units is the shape and dimensions of each of the rams 23. The upper portion or head 26 of each of the rams 23 are of such fit (normally, a clearance of several thousandths of an inch) that the liquid is expressed around the circumference of the head between the cylinder walls and into the bottom of the cylinder 22. It has been found, surprisingly, that the wall clearance need not be as low as would be expected. Thus, it would be predicted that the clearance would necessarily be lower than the diameter of the smaller particles, in order to prevent clogging, and "sheeting" of the lead on the cylinder walls. However, the clearance provided is not unduly restricted, it being discovered that the resistance upon compacting certain particular metal sludges is primarily in the lengthwise direction, so that there is apparently no direct radial distribution. Forces of such nature would tend to cause jamming of particles in the clearances. The relief ports 24 provide passages for draining liquid into the collecting pan 90 and further draining through the take off line 91 connected thereto. Another important feature of each of the rams 23 is a recess or groove 28 extending around the circumference or perimeter of the lower end of the ram. It is by this means that a ram return assembly 70, described hereinafter, can engage said ram and withdraw it to its extreme downward position, thereby readying the chamber and ram for receiving a new charge at the charge station. The details of apparatus for this particular function will be explained hereinafter.

Figure 2A:
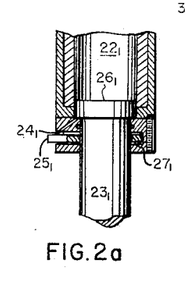
Figure 2a, shows a detail of a locking mechanism forming a particularly beneficial segment of a particular embodiment.

The position of a ram, with respect to its chamber and the charging means, is shown in Figure 2a which is a partial section view 2a—2a. The ram $23_1$ is at the lowermost position. Surmounting the cylinder $22_1$ is a charging means 31 which generally includes a base plate 32, a flexible connection 33 and a hopper 34. When in this position it will be seen that the chamber-ram unit is adapted to receive the full volume of slurry by gravity feed into the chamber $22_1$. When the chamber $22_1$ is filled it is ready for transport to the next station. It should be noted, in connection with the operation of the feeding hopper 34 and a cylinder-ram unit at the charging station, that the upper surface 20 of the transport table 21 acts as a seal for closure of the charging mechanism. In other words, the rotation of the transport table 21 results in automatic closure of the hopper during rotation.

Figure 2B:
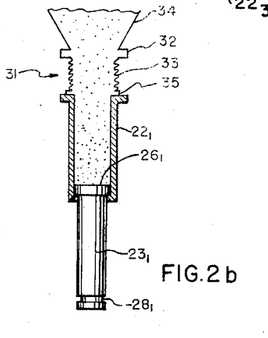
Figure 2C:
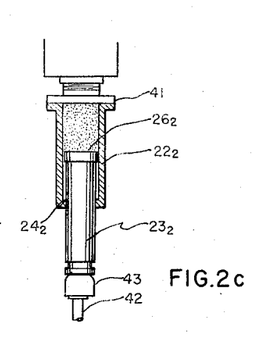

A ram-chamber unit, and charge, after a pre-compression step, is shown in Fig. 2c which is partly-sectioned elevation 2b—2b. At this station the cylinder $22_2$ is directly surmounted by a backup plate 41, and an initial compression apparatus comprising a cylinder-piston combination 42. The piston of this combination has an engaging or push face 43 for operative engagement with the end of the ram $23_2$. It will be noted that the position of the ram $23_2$ indicated in the sectional elevation is at the termination of its operation for this station. When first positioned at a pre-compression station, the ram $23_2$ is in its lowermost position and was there engaged by the piston of the cylinder-piston unit 42 and raised in the cylinder $22_2$, thereby compressing the charge therein, usually to about one-half the original volume. This degree of compression of course depends upon the characteristics of the sludge or materials being processed.

It should be further understood that this initial compression is inevitably accompanied by a partial deliquefying operation. This initial stage is, in effect, a squeezing together of the initial solid particles of the sludge with a diminution of the size of the voids involved, but with no appreciable deformation of the particles of metal present. The liquid so displaced or released by the diminution or volume of these voids is expressed past the head $26_2$ of the ram and escapes downwardly along the walls of the chamber $22_2$. Provision is made for discharge of this liquid through the release hole $24_2$. The liquid then passes into the collection pan 90 a part of which is located beneath this station.

Figure 2D:
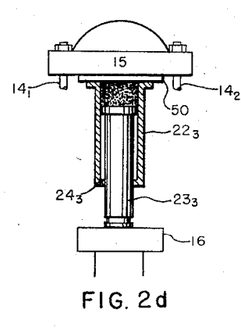

Figure 2d, which is a partially sectional view 2c—2c, illustrates a ram chamber unit at the station of final compression. Forming a part of the final compression station apparatus is a main backup block 50, fastened to the press head 15, and a platen 16 in pressing position. It will be noted that in this illustrated section ram $23_3$ is in its terminal position of operation for this station, but the platen 16 has yet to be lowered. Thus, the ram $23_3$ which had pressed its charge to approximately one-half its volume in the previous station has now further pressed the charge with such force that it is virtually free of water and the solid particles therein compacted into a cohesive mass.

The liquid released by this further decrease in volume escapes around the face of the ram $23_3$ and downwardly along the walls of the chamber $22_3$. It is then discharged through the release hole $24_3$, into the collection pan 90.

Before the chamber can be transported to the next station of operation, the platen 16 must be disengaged, by lowering from contact with the ram $23_3$. This is accomplished by means of two push back units, $18_1$, $18_2$ shown in Fig. 1, each of which includes a cylinder and mating piston actuated by a hydraulic system. When the platen 16 is pushed back far enough to disengage the ram $23_3$ the chamber is then ready to be transported to the next station, shown in Figure 2c.

Figure 2E:
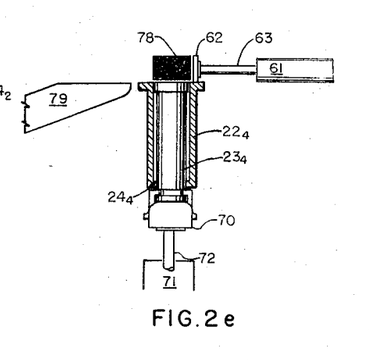

Figure 2e illustrates a cylinder-ram unit at the final station upon discharge of a completed, pressed form 78. In addition to apparatus for discharge of the compacted mass from the cylinder, also associated with this station are means whereby the ram $23_4$ may be reset or withdrawn. By this is meant that the ram is lowered to the lowermost position, so that most of the volume of the chamber $22_4$ is open and available to receive a full fresh sludge charge. The means for this function include a ram return assembly 70 which is attached to the end of the piston rod 72 which is activated by the piston of the double acting cylinder-piston unit 71. A further necessary portion of the discharge station equipment are means to disengage the lock mechanism associated with each cylinder-ram unit. When the preferred form of locking mechanism, as already described, is employed, this required disengaging means is suitably a simple cam surface, positioned to elevate the free side of a lock ring 25 to provide a horizontal disposition thereof. As previously noted, when a lock ring is horizontally positioned, the ram 23 is free to descend in the corresponding chamber 22. It will be noted that the ram $23_4$ as illustrated is at its terminal position of operation and is "grasped" by the ram return assembly 70, described more fully below. A further operative means associated with the final discharge station is an ejection apparatus, including a horizontally positioned, double acting cylinder-piston unit 61, with a push plate 62 attached to the end of the piston rod 63. The cylinder-piston unit 61 is disposed to thrust, horizontally, a discharged billet 78 from a position resting at the topmost extremity of the chamber $22_4$.

In the discharge station, then, the ram $23_4$, having pressed the sludge at the previous station until virtually free of water and having compacted the solids into a cohesive mass, has now been engaged by and moved upward to its terminal position by upward movement of the piston rod 72. The billet 78 is discharged from the chamber $22_4$ and ejected, or moved generally horizontally, by the movement of the ejection piston rod 63. The ejected billet is received by a chute 79 provided therefor and is conveyed to subsequent processing or storage.

From the position of the ram $23_4$ shown in Figure 2e, the ram $23_4$ must be repositioned or retracted to its extreme downward position as shown in Fig. 2b. It must then be disengaged from the ram return assembly 70. This function is accomplished at the discharge station by means described below.

Fig. 3 includes an elevation sectional view of a ram return assembly 70 fastened to a piston rod 72. Secured to the end of the piston rod 72 is a ram return button 77 having an engaging face 80 for operative engagement with the end of the ram $23_4$. In recesses $81_1$, $81_2$ on either side of the ram return button 77 and opposite one another are two button arms $74_1$, $74_2$. The button arms are pivoted on pins $75_1$, $75_2$ and held under tension by the springs $76_1$, $76_2$ each having one end thereof bearing on the ram return button. An upper beveled surface $73_1$, $73_2$ is provided at an angle such that when it is brought into contact with the bottom of the ram $23_4$, the button arms $74_1$, $74_2$ will be deflected outward, with deflection of the respective button arm spring $76_1$, $76_2$. The lower side $82_1$, $82_2$ of each of the upper projections of the button arms $74_1$, $74_2$ are adapted to engage the lower edge of the groove or recess $28_4$ in the ram $23_4$ when the working face 80 of the assembly is engaging the end of the ram. The button arms $74_1$, $74_2$ are of such dimensions that when the face 80 of the ram return button 77 has engaged the lower face of the ram $23_4$ the recessed portion $28_4$ of the lower end of ram $23_4$ and the upper projections of the button arms $74_1$, $74_2$ will drop into the recess $28_4$ and lock. This locking action occurs automatically upon upward movement of the piston rod 72 of the cylinder-piston unit 71 and permits retraction of the ram, after the compressed solid charge has been removed.

The ram $23_4$, locked to the ram return assembly 70 as described, is forcibly withdrawn by downward movement of the assembly. As it approaches its extreme downward position (shown in Fig. 2b) it is released by the ram return assembly 70. This is accomplished by engagement of the ram return assembly 70 with a cam means 84. This cam is essentially a tube co-axial with the ram return assembly 70. An upward diverging section 85 is provided to operatively engage the ram return assembly as it moves downward. Projections or shanks $83_1$, $83_2$ are provided on the button arms 74, which extend outside the recesses 81. When the ram $23_4$ has been pulled downward as far as possible (corresponding to the position of the ram $23_1$ shown in Figure 2b), each of these projections or shanks 83 are cammed inward by the inner wall of the cam 84 into which the ram return assembly 70 is drawn. This pivots each of the button arms 74, and causes disengagement from the ram $23_4$. The vertical disposition of the cam 84 is important, in that it will be seen that downward movement of the ram return assembly 70 should be continued beyond the point of maximum downward travel of the ram. This assures that the button arms 74 will clear the bottom of the ram $23_4$. This will permit the movement of the ram-chamber unit, to the next station, by the transport table 21. An alternative arrangement, not shown, provides for disposition of the return button arms 74 on a radial plane intersecting the center of the transport table 21. With this disposition, the ram return button assembly is not withdrawn below the lowermost ram position. The engagement and disengagement of the button arms is accomplished by the arcuate movement of the ram-chamber units themselves.

From the foregoing, it will be seen how the apparatus provides for serially positioning the cylinder-ram units in successive stations for discrete operations to be singly performed at each station. Except for the initial, or charging station, the operation at each station includes an upward movement of the individual rams within the cylinder of the corresponding unit, to effect, respectively, a pre-compression, a final compression, and an ejection of the final compressed billet, respectively. It will be readily understood that various actuating mechanisms or means can be provided to cause the movement of the individual rams within the separate cylinder units, and also to provide the work of rotation or transport of the cylinder-ram units to successive stations. A hydraulically actuated mechanism is particularly suitable for this function, and is illustrated by Fig. 5 and described below.

Figure 5:
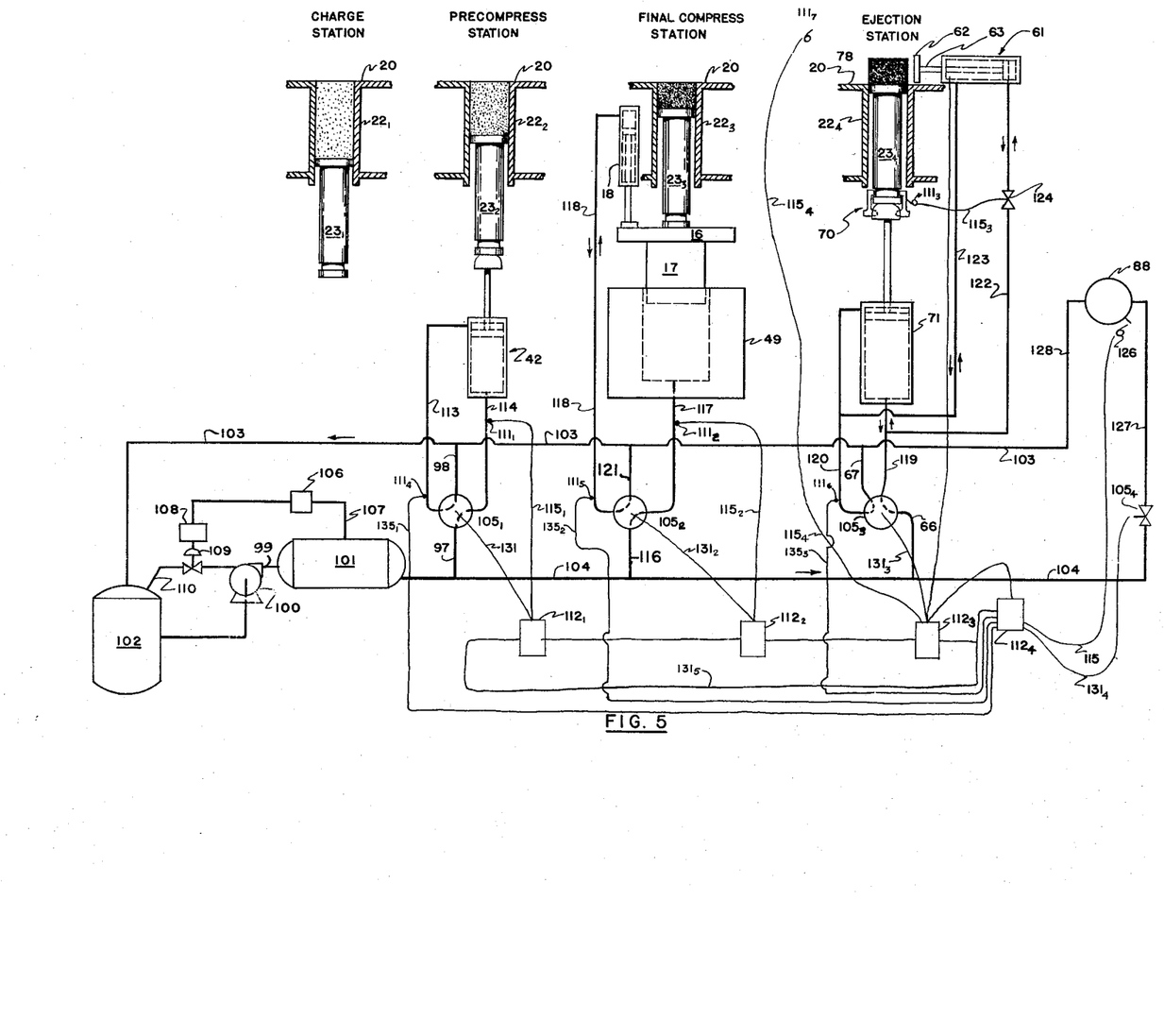
Fig. 5 is a schematic illustration of a hydraulic powering system associated with the preferred embodiment of Figs. 1–4, plus a highly effective apparatus for automatic control of preferred embodiments such as shown by Figs. 1–4.

Turning to Fig. 5, this figure shows, in "exploded" fashion the four cylinder-ram units $23_1$, $23_2$, $23_3$, $23_4$ positioned in each of the operating stations. In addition, hydraulically actuated mechanisms are shown associated with the several stations individually occupied by the cylinder-ram units. It will be understood that the positions of the rams of the cylinder-ram units $23_2$, $23_3$ and $23_4$ shown are only single positions occurring while at the respective stations, the full operational cycle at each of these stations including movement from or to other positions.

Associated with each of these stations, except the charging station, are means by which power is supplied to the individual rams to effect the desired processing. The powering means can be mechanical or electrical or fluid motivated. A hydraulically actuated system is found particularly beneficial as illustrated. With the pre-compression stage is associated a double acting cylinder piston unit 42. With the final compression stage is associated a platen 16 mounted on the ram 17 which slides vertically within a cylinder within the main press base 12. And, finally, with the ejection stage is associated a discharge cylinder-piston unit 71 and a ram return assembly 70, associated with the cylinder piston unit as already described.

Hydraulic liquid is supplied to, or received from, these several actuating units by a control system which includes a pump 100, an accumulator 101, a reservoir 102, a high pressure manifold 104 and a low pressure manifold 103. The pump 100 is desirably of the positive displacement type, such as a piston or ram type. Alternatively, a multi-stage centrifugal type pump can be employed but is less desirable. The pump exhausts through a line 99 into the accumulator 101. The accumulator 101 consists of a sealed drum partly filled with the hydraulic liquid and also containing compressed air or inert gas. The purpose of this system is to maintain a substantially constant or steady pressure for the most effective movement of the several cylinder-piston units.

In the pre-compression stage is shown the cylinder-piston unit 42 by which force is applied to the ram $23_2$ resulting in the initial compression of the sludge. Supply lines 114, 113 respectively connect the ends of the double acting cylinder 42 to a four-way valve $105_1$. This valve $105_1$ is connected by lines 97, 98 to the high pressure manifold 104 and to the low pressure manifold 103 respectively. Accordingly, liquid from the high pressure manifold 104 can be transmitted to the lower portion of the pre-compression cylinder 42 while the upper portion of the pre-compression cylinder 42 is connected to the low pressure manifold 103. Reverse connections can also be provided, i.e., the lower portion of the pre-compression cylinder 42 can be connected through the four-way valve $105_1$ to the low pressure manifold 103 and the upper portion of the pre-compression cylinder 42 can be connected to the high pressure manifold 104. The four-way valve $105_1$ can also be closed completely thus permitting no flow through either line 113 or 114.

As previously discussed, a main press ram 17 is provided for the final compression operation on a ram-chamber unit and its charge. Contact with the ram of the ram-chamber unit is made by the platen 16 mounted on the press ram 17. The press ram 17 can be considered a single acting piston. A line 117 leads from the cylinder 49, of the main press to a four-way valve $105_2$, to provide feed of hydraulic liquid from the high pressure manifold 104, or to allow discharge to the low pressure manifold 103, as necessary. Connecting lines 116, 121 from the valve $105_2$ to the manifolds are provided. The push back cylinder-piston unit 18 is similarly connected, by line 118 and the four-way valve $105_2$, to the high pressure manifold 104 and to the low pressure manifold 103. As with the operation of the precompression cylinder 42, hydraulic liquid can be passed from the high pressure manifold 104 to the lower portion of the final compression cylinder 49, for a press stroke, while the upper portion of the push back cylinder 18 is open to the low pressure manifold 103 by means of line 118 through the four-way valve $105_2$. In retracting operation, the high pressure manifold 104 is connected through line 118 to the upper portion of the push back cylinder 18 and the main press cylinder is discharged to the low pressure manifold 103 through line 117 by repositioning of the four-way valve $105_2$. In addition, both the high pressure manifold 104 and the low pressure manifold 103 may be closed off from the systems altogether by appropriate position of the four-way valve $105_2$.

As already discussed, the ram return assembly 70 of the final station is actuated by a double-acting cylinder-piston unit 71. In addition, a double-acting cylinder-piston unit 61 is provided for ejection of a final pressed billet 78 after it is discharged from the chamber $22_4$. A supply line 119 connects the lower end of cylinder 71 to four-way valve $105_3$. Connecting lines 66, 67 pass from the valve $105_3$ to the high pressure manifold 104 and the low pressure manifold 103. A further supply line 120 connects the top end of cylinder 71 to the four-way valve $105_3$, and thence to the high pressure manifold 104 or the low pressure manifold 103. A branch line 122, from the supply line 119 to the discharging cylinder 71 leads to one side of the ejection cylinder unit 61. A valve 124 in this branch line provides individual control of feed to this cylinder for the ejection stroke. A return line 123 from the ejection cylinder unit 61 is coupled to supply line 120. It will be seen that by proper setting of the valve $105_3$, liquid can be admitted to the lower end of the cylinder 71 from the high pressure manifold, and discharged from the top end of the cylinder 71 to the low pressure manifold 103. While pressure is on the supply line 119, opening of the valve 124 will result in movement of the piston of the ejection cylinder-piston unit 61 toward the billet 78 supported on the top of the ram $23_4$ located at this station. This is accompanied by discharge of liquid from the opposite end of the ejection cylinder 61 to the low pressure manifold 103. Appropriate reversal of the valve $105_3$ provides for retraction of the ram return cylinder unit 71 and retraction of the ejection cylinder unit 61. The flow in all the lines mentioned can be stopped by proper setting of the four-way valve $105_3$.

A hydraulic motor 88 is provided to rotate the transport table 21. The hydraulic motor 88 is connected by means of line 127 through the valve $105_4$ to the high pressure manifold 104 and by line 128 to the low pressure manifold 103.

The foregoing describes operation of the hydraulic actuating units individually. The benefits of the present invention arise in large part from the segregation of portions of an overall processing cycle and in providing means which concurrently perform these portions on separate charges. The following is a resume of the concurrent operations of the several actuating means described above. A constant pressure is maintained in the high pressure manifold 104 by direct connection with the accumulator 101. When the four-way valves $105_1$, $105_2$, $105_3$ are in the position shown in the figure the fluid is forced under pressure from the high pressure manifold 104 through these valves and into the bottom of the respective cylinder units. Thus, in a given time cycle, hydraulic liquid is passed concurrently (a) Through the four-way valve $105_1$ through line 114 and into the bottom of the pre-compress cylinder unit 42 thereby forcing the piston upward against the ram $23_2$ and compressing the charge.

(b) Through the four-way valve $105_2$ and into the cylinder 49 of the main press 11, causing upward movement of main press ram 17.

(c) Through the valve $105_3$ and line 119 into the bottom of the discharge cylinder unit 71 thereby forcing the ram return assembly 70 upward against the bottom of the ram $23_4$. This results in engagement of the ram assembly 70 to the ram $23_4$ as previously described.

(d) After the discharge cylinder unit 71 has reached its topmost position, the valve 124 is opened and liquid flows to the ejection cylinder 61, causing the push plate 62 to move the final pressed billet 78 to the delivery chute 79.

During these operations liquid is drained from the "non-working" side of the pre-compress cylinder 42, and of the discharge cylinder 71, and the ejection cylinder 61, and passes through the respective supply lines and valves into the low pressure manifold 103 where it drains into the reservoir 102. Liquid also is expelled from the push back cylinder units 18 through supply line 118 and ultimately to the reservoir 102.

During this sequence of operations the valve $105_4$ which connects lines 127 and 128 to the hydraulic motor 88 is closed.

Upon completion of the above "working" operations, the movement of the several hydraulic units is reversed, to return the moving parts to positions for performing the working operations on the next-positioned ram-chamber units. This reversal portion of a cycle includes retraction of the piston of the pre-compression cylinder-piston unit 42, retraction of the main press ram 17 (and extension of the push back units 18), and retraction of both the discharge unit 71 and the ejection cylinder-piston unit 61.

These return, or non-working, strokes of the several hydraulic cylinder-piston units are initiated by appropriate reversal of flows by the valves $105_1$, $105_2$, $105_3$. This reversal is preferably done substantially concurrently, When these actions are completed the table 21 must be rotated one-quarter turn, to serially position the ram-chamber units for a repetition of the several segments of the cycle. The valve $105_4$ is kept closed during the whole sequence of operation so far outlined. During the part rotation, the valves $105_1$, $105_2$, $105_3$ controlling the supply and discharge of hydraulic liquid to the several operating cylinders are adjusted or set to prevent flow of any hydraulic liquid to or from these units. The part rotation of the transport table is accomplished by controlled operation of the hydraulic motor 88. The general arrangement of the transport table 21 and its relation to other parts of the apparatus is shown by Fig. 4.

Referring to Fig. 4, this is a schematic plan view of a cross section of the transport table 21 above which is shown the press head 15 to which is attached a hydraulic motor 88. The power from the hydraulic motor is transmitted by means of a pinion gear meshed with a large gear 82 fastened to the transport table 21.

Shown also in Fig. 4 is the double acting ejection cylinder-piston unit 61 which is actuated by the hydraulic system in the manner already described. Secured to the end of the piston rod 63 is a push plate 62, to direct the billet 78 in the correct ejection path.

From the foregoing description, it will be clear that the apparatus can be very effectively operated by manual control, that is, manual actuation of the several valves for the hydraulic system. To obtain the most benefit for the invention, automatic means for effecting the valve operations, and hence of the several mechanisms associated with the processing stations, will be particularly beneficial. A highly preferred automation system is also illustrated in Fig. 5, the system including a plurality of electrical switch means response to various indicia of operation of the station mechanisms, and in turn initiating actuating signals to mechanisms of known type for operating the valve means. Associated with this system is a pressure control system for the hydraulic liquid system.

Referring to Fig. 5, a pressure gauge 106 senses the pressure in the accumulator 101 by a pressure tap line 107. The pressure gauge 106 is desirably combined with a controller 108, which is operatively connected to a motored valve 109, mounted in a by-pass or return line 110. A set point mechanism is incorporated in the controller 108. Deviation of the pressure in the accumulator 101 above or below the desired pressure results in operation of the motored by-pass valve 109 to restore the necessary or needed pressure.

The automation control system generally includes control means associated with each station (except for the feeding station) plus control means responsive to the completion of all of the concurrent operations conducted at the several work stations. From the foregoing description of operations, it will be clear that the pre-compression, final compression and discharge operations are desirably started substantially concurrently. The duration of these separate powered operations will vary and not be absolutely uniform. Accordingly, means must be provided to assure completion of these operations before transport of the ram-chamber units to the next stations.

Turning to the individual stations and control means associated therewith, the pre-compression station is cited first. A pressure responsive switch $111_1$, in the feed line 114 to the working side of the cylinder-piston unit 42 is connected by a lead $115_1$ through a relay $112_1$ which in turn is connected by a lead $131_1$ to actuating means (not shown) for the four-way control valve $105_1$.

In operation, the piston of the pre-compression cylinder-piston unit 42 rises until a predetermined pressure is built up in the cylinder thereof. The pressure switch $111_1$ then signals the relay $112_1$ which in turn actuates a reversal of the motored valve $105_1$. This reverses the flow of hydraulic liquid as already described, and the piston of the cylinder-piston unit descends to its lowermost position, and remains at this position until the valve $105_1$ is repositioned for a working stroke in the next cycle.

The feed line to the main press cylinder 49 is similarly provided with a pressure responsive switch $111_2$, also connected by a lead $115_2$ to a second relay $112_2$, which in turn is connected by a powering circuit $131_2$ to the motored valve $105_2$. It will be recalled that the main cylinder of the main press 11, in conjunction with the push back units $18_1$, $18_2$ are, in effect, a double-acting cylinder-piston unit. Hence, reversal of flow as used at this point refers to changing the flow to provide a "powered" stroke of the push back units 18 as contrasted with a working or compressing stroke of the ram 17 of the main press 11. In operation, then, during a ram working stroke, the pressure in the supply line 117 increases as the resistance of the sludge charge being processed to compression increases. When a pre-determined pressure is attained in the feed line 117, a pressure switch $111_2$ signals a relay $112_2$ and causes repositioning of the four-way valve $105_2$ to provide the reversal strokes of the main pressure ram 17 and the push back units 18. Under the influence of this reversed flow, the main ram is retracted, normally, to its lower-most position and remains at that point with full line pressure being applied to the push back units 18. In certain preferred embodiments of the invention, described more fully hereinafter, the retraction of the main press ram 17 is curtailed to correspond to the anticipated position demanded by the position of the ram of the chamber-ram unit next to be processed.

The last powered station for discharge and ejection of a compressed solids billet includes, as already stated, a double-acting cylinder-piston unit 71 (for discharge of the billet 78 from the chamber $22_4$) and a double-acting cylinder-piston unit 61 for ejection of the discharged billet 78 from the apparatus.

A position switch $111_3$ is provided for actuation by the ram return assembly 70 upon its attainment of an uppermost position, which is accompanied by positioning of the compressed billet 78 flush with the top surface 20 of the transport table 21. A lead $115_3$ from this position switch to the motored valve 124 provides for actuating signals to said valve upon attainment of the described position. A second positional switch $111_7$ is provided for engagement by the push plate 62 when the ejection cylinder unit 61 thrusts the push plate 62 to its extended position. A lead $115_4$ to the relay $112_3$ is provided, for actuating signal thereto, which results a powering impulse through lead $131_3$ and reversal of the valve $105_3$.

In operation, upward movement of the return assembly to its topmost position results in engagement of the position switch $111_3$. This results in an actuating signal to the motored valve 124, which, thereupon opening, allows flow of liquid through supply line 122, thus comes extension of the ejection piston 63. As the push plate 62 engages the second positional switch $111_4$, a signal is transmitted through lead $115_4$ to the relay $112_3$, which results, by a powering impulse through lead $131_3$ to the valve $105_3$, of a reversal both of the discharge unit 71 and of the ejection unit 61. If the pistons of these two units are retracted to their extreme position, they are then retained at that point by the line pressure until the valve $105_3$ is again repositioned, for the described working strokes.

It will be seen that the completion of all three of the cycles of powered station means determines the conditions required before the several chamber-ram processing units can be rotated to the succeeding position. Pressure switches $111_4$, $111_5$, $111_6$ are provided in the supply lines 113, 118, 120 which provide flow of hydraulic liquid to the hydraulic units for the retracting or nonworking strokes. Inasmuch as the retracting or return strokes are against only the frictional resistance of the several moving parts, it will be seen that the full line pressure in the supply lines will be attained only when the respective hydraulic elements have reached their fully reported position and are stopped by the cylinder ends. Thus, when the push back unit 18 has moved the main press ram 17 to its lower-most position, full manifold line pressure will be attained in the supply line 118. The pressure switch 111$_5$ will then provide a signal through line 135$_2$ to a controller-relay 112$_4$. Similarly, pressure switches 111$_4$, 111$_6$ in the return supply lines 113, 120 to the pre-compression hydraulic cylinder-piston unit 42 and the discharge cylinder-piston unit 71 will provide equivalent signals upon retraction of the pistons of those units, through the corresponding lines 135$_1$, 135$_3$.

Appropriate switch means associated with the controller-relay 112$_4$ respond to the above plurality of pressure signals, and cause action of the relay, which provides an actuating signal through lead 131$_4$ to motored valve 105$_4$, causing actuation thereof. This permits the hydraulic motor 88 to rotate the transport table 21.

A last positional switch 126 is responsive to positioning of the transport table 21 by means of any suitable projection thereon engaging the switch 126. In operation, the motor 88 causes rotation of the transport table until said projection engages the switch 126. Actuation of this positional switch 126 sends a signal through a lead 115 to controller-relay 112$_4$. This signal results in closing of motored valve 105$_4$. Concurrently, by an energizing signal through a circuit 131$_5$, the relays 112$_1$, 112$_2$, 112$_3$ associated with pre-compression hydraulic cylinder 42, the main press ram 17 and the discharge unit 71, respectively, are energized. This causes positioning of the respective valves for initiating working strokes.

To further illustrate the benefits of a specific embodiment of this invention, in a typical apparatus as described and illustrated by the figures, the following design and operational details are of interest. A feed of predominantly lead sludge, from a tetraethyllead manufacturing process is provided, containing about 10 percent water, about 1 percent sodium chloride, minor quantities of tetraethyllead, about 89 percent lead. The particle size distribution of the solids vary widely, but includes particles having a diameter of the order of 0.005 to 0.05 inch.

The chambers of the chamber-ram units were open-ended cylinders having a length diameter ratio of about 4:1. The hydraulic system utilized as already described, a common supply pump, capable of providing flow of an inert oil hydraulic liquid at a pressure of about one thousand pounds per square inch gauge. The proportions of the main ram, of the pre-compression piston-cylinder unit and of the discharge piston-cylinder unit were such as to provide a unit maximum pressure on the charge of lead containing material in the respective cylinders of the cylinder-ram units, of 500, 22,000, and about 500 pounds per square inch, in the pre-compression, final compression and discharge operations, respectively. An operational cycle of less than one minute, usually about 45 seconds is provided. This operational cycle includes roughly 30 seconds for the power strokes and the retracting strokes of the hydraulic cylinders associated with the work stations, and from 5 to 10 seconds for operation of the hydraulic means and partial rotation of the transport table. It will be recalled that the several processing steps all occur concurrently, and that the 30 second segment mentioned is the time involved for the longest of the several concurrent processing steps. This longest step usually is the final compression and the return of the main press ram to a retracted position.

The lead sludge described is processed to provide very dense billets. Analyses of representative sample portions of such billets show a reduction in the liquid content, to a fraction of a percent. Being massive and relatively liquid free, these billets are particularly susceptible of efficient subsequent smelting.

As previously mentioned, the invention is capable of numerous different embodiments involving variations in most of the apparatus elements thereof.

The work stations provided by the apparatus are not restricted to the single pre-compression operation specifically described above. In certain instances, two or even more pre-compression work stations are sometimes desirable. This variation involves additional appropriate means for effecting the desired operations at the additional stations.

As already described, a vital feature of the preferred embodiment of the invention are lock means associated with each chamber-ram unit for maintaining a ram in specific elevated position until disengagement is provided. Alternatively to the preferred annular type lock means described above, various ratchet or lock means can be employed with generally similarly effective results. Thus, an eccentrically mounted roller engaging the side of the ram would be fully effective. Such alternative disengageable lock means, however, would somewhat complicate the necessary disengaging means associated with the last work station (the discharge station).

The ram-chamber units employed in all forms of the invention are preferably of the cylindrical type. However, it is occasionally preferred to provide a cohesive product billet having a cubical configuration or the like. In such instances, chambers of square or rectangular cross-section, would, of course, be preferred. Although the chambers are particularly ideally incorporated integrally with the transport mechanism, it will be understood that they can be detachably mounted on the transport mechanism. The length and cross-sectional area of the ram-chamber units is also subject to appreciable variation dependent upon the properties of the materials to be processed by the embodiment.

The working pressure of the hydraulic system, when such is employed for the stations operating means, is also subject to appreciable variations. Generally, working pressures of the order of about 2,000 pounds per square inch should not be exceeded. By appropriate adjustment or relationship of the size of the piston-cylinder units of the hydraulic system to the proportions of the chamber-ram units, the necessary forces are easily provided for.

The details of the transport device are also subject to variation if necessary. A rotatable device providing a circularly arranged station pattern is preferred because of relative simplicity of design. However, when a larger number of work stations is necessary than conventionally adaptable to a circular pattern, a transport mechanism resembling a conveyor is fully operable. This may desirably provide an oval station pattern or the like.

It will be further understood that the apparatus of the invention is not confined to processing any single composition of feed material. Although peculiarly effective for processing predominantly lead sludges from various chemical operations, the apparatus can be readily adapted to process other high solids sludges.

Having described the invention fully and the best manner of its design, what is claimed is:

1. Apparatus for the deliquefying of high solids content sludges, and for forming shapes of the solids therein, comprising, at least four vertically aligned ram-chamber units, the chambers thereof being open end cylinders of uniform cross section and being relatively long compared with the diameter, a ram being slidably mounted in each chamber, an end of the ram forming a moving face substantially coextensive with the chamber cross section and being positionable from near the lower end of the chamber to flush with the upper end, a unidirectional rotary transport mechanism adapted to concurrently transport and position each of the said ram-chamber units serially to a plurality of work stations which include a charging station, at least one initial compressing station, a final compressing station and a product discharge station, separate means associated with each of said stations, for operations at said stations, said means including a charge loading means for charging sludge to a chamber at the charging station, while the ram therein is at its lowermost position, initial compressing means for moving a ram upwardly a portion of the chamber depth, and thus compressing partly a charge in the chamber while at an initial compressing station, final compressing means for further upwardly moving a ram in a chamber and further compressing a charge in the chamber while at the final compressing station, and product discharge means including means for moving a ram to the topmost position in a chamber at the product discharge station, so that the compressed charge is vertically displaced from the chamber and laterally displaced, and locking means associated with each ram-chamber unit for maintaining the vertical disposition of a ram upon completion of the operation at a specific station and during transport thereof to the succeeding station.

2. The apparatus of claim 1 further defined in that the locking means associated with each of the ram-chamber units comprises an annular ring having an interior diameter slightly larger than the ram, said ring being pivotally attached at the bottom of a chamber and encircling the ram, slidably mounted in said chamber, whereby the weight of the ring causes locking engagement with the ram when at a partially elevated position, and retention of the ram in said position.

References Cited in the file of this patent

UNITED STATES PATENTS

| | | |
|---|---|---|
| 819,781 | Morris | May 8, 1906 |
| 1,332,983 | Gilmore | Mar. 9, 1920 |
| 1,336,164 | Shortell | Apr. 6, 1920 |